(12) United States Patent
Lei et al.

(10) Patent No.: US 9,940,007 B2
(45) Date of Patent: Apr. 10, 2018

(54) SHORTENING MULTIMEDIA CONTENT

(71) Applicant: International Business Machines Corporation, Armonk, NY (US)

(72) Inventors: Chang Lei, Shanghai (CN); Hu Wang, Beijing (CN); Cheng Zhang, Beijing (CN); Jian Zhang, Beijing (CN); Chao Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/051,762

(22) Filed: Feb. 24, 2016

(65) Prior Publication Data

US 2017/0242571 A1  Aug. 24, 2017

(51) Int. Cl.
| | |
|---|---|
| *G06F 3/00* | (2006.01) |
| *G06F 3/0484* | (2013.01) |
| *G11B 27/031* | (2006.01) |
| *H04L 29/06* | (2006.01) |
| *G06F 3/0488* | (2013.01) |
| *G06F 3/0485* | (2013.01) |
| *G06F 17/30* | (2006.01) |

(52) U.S. Cl.
CPC ........ *G06F 3/04847* (2013.01); *G06F 3/0485* (2013.01); *G06F 3/0488* (2013.01); *G06F 17/30058* (2013.01); *G11B 27/031* (2013.01); *H04L 65/601* (2013.01)

(58) Field of Classification Search
CPC .................................................... G06F 3/0485
USPC ....................................................... 715/716
See application file for complete search history.

(56) References Cited

U.S. PATENT DOCUMENTS

| | | | |
|---|---|---|---|
| 8,229,287 B1 | 7/2012 | Duggal et al. | |
| 8,732,597 B2 | 5/2014 | Ludolph et al. | |
| 9,354,797 B2* | 5/2016 | Jiao | G06F 3/04855 |
| 2012/0089936 A1* | 4/2012 | Chiu | G01C 22/006 |
| | | | 715/772 |
| 2012/0284094 A1 | 11/2012 | de Leon et al. | |
| 2013/0287365 A1 | 10/2013 | Basapur et al. | |

(Continued)

FOREIGN PATENT DOCUMENTS

WO   2015038342 A1   3/2015

OTHER PUBLICATIONS

Mell et al., "The NIST Definition of Cloud Computing", National Institute of Standards and Technology, U.S. Department of Commerce, Special Publication 800-145, Sep. 2011, 7 pages.

*Primary Examiner* — William Titcomb
(74) *Attorney, Agent, or Firm* — William H. Hartwell

(57) ABSTRACT

A method to display a representation of multimedia content that includes a progress bar. The method includes shortening a portion of the multimedia content having a start time and an end time from an original length to a shortened length based on a received indication and modifying the progress bar to represent the shortened portion of the multimedia content. The original length of the portion is represented by a curve adjacent to the progress bar, where a first end of the curve is adjacent to the progress bar at a location indicating the start time, and where a second end of the curve is adjacent to the progress bar at a location indicating the end time, and the shortened length of the portion is represented by a distance on the progress bar between the location indicating the start time and the location indicating the end time.

20 Claims, 12 Drawing Sheets

(56) References Cited

U.S. PATENT DOCUMENTS

| | | | |
|---|---|---|---|
| 2014/0201633 A1* | 7/2014 | Jiao | G06F 3/04855 715/716 |
| 2015/0012225 A1* | 1/2015 | Mattila | G06F 19/3431 702/19 |
| 2015/0026575 A1* | 1/2015 | Martin | G06F 3/04842 715/720 |

* cited by examiner

SHORTENING MULTIMEDIA CONTENT

BACKGROUND

The present invention relates generally to the field of multimedia content, and more particularly to modifying the playback of multimedia content.

Multimedia content is content that may include a combination of text, audio, still images, animation, video, or interactive content forms (e.g., a video with interactive controls or a web site that includes scrollable text). Multimedia content may include an on-screen interaction component, such as an interactive progress bar. For example, a user may play an audio file using a portable device such as a smart phone. The smart phone may include a touch screen that incorporates a progress bar to enable the user to determine a current time of the audio file, and a total time of the audio file.

A progress bar is a graphical control element used to visualize the progression of an extended computer operation, such as a download, a file transfer, an installation, or a multimedia playback, such as the playback of an audio or video file. Sometimes, a progress bar graphic is accompanied by a textual representation of the progress in a percent format. Progress bars typically use a linear function, such that the advancement of a progress bar is directly proportional to the amount of work that has been completed, or the amount of time that has elapsed.

SUMMARY

Embodiments of the present invention disclose a method, computer program product, and system for displaying a representation of multimedia content that includes a progress bar. The method includes shortening a portion of the multimedia content having a start time and an end time from an original length to a shortened length based, at least in part, on a received indication and modifying the progress bar to represent the shortened portion of the multimedia content. The original length of the portion is represented by a curve adjacent to the progress bar, where a first end of the curve is adjacent to the progress bar at a location indicating the start time, and where a second end of the curve is adjacent to the progress bar at a location indicating the end time, and the shortened length of the portion is represented by a distance on the progress bar between the location indicating the start time and the location indicating the end time.

DETAILED DESCRIPTION

Figure 1:
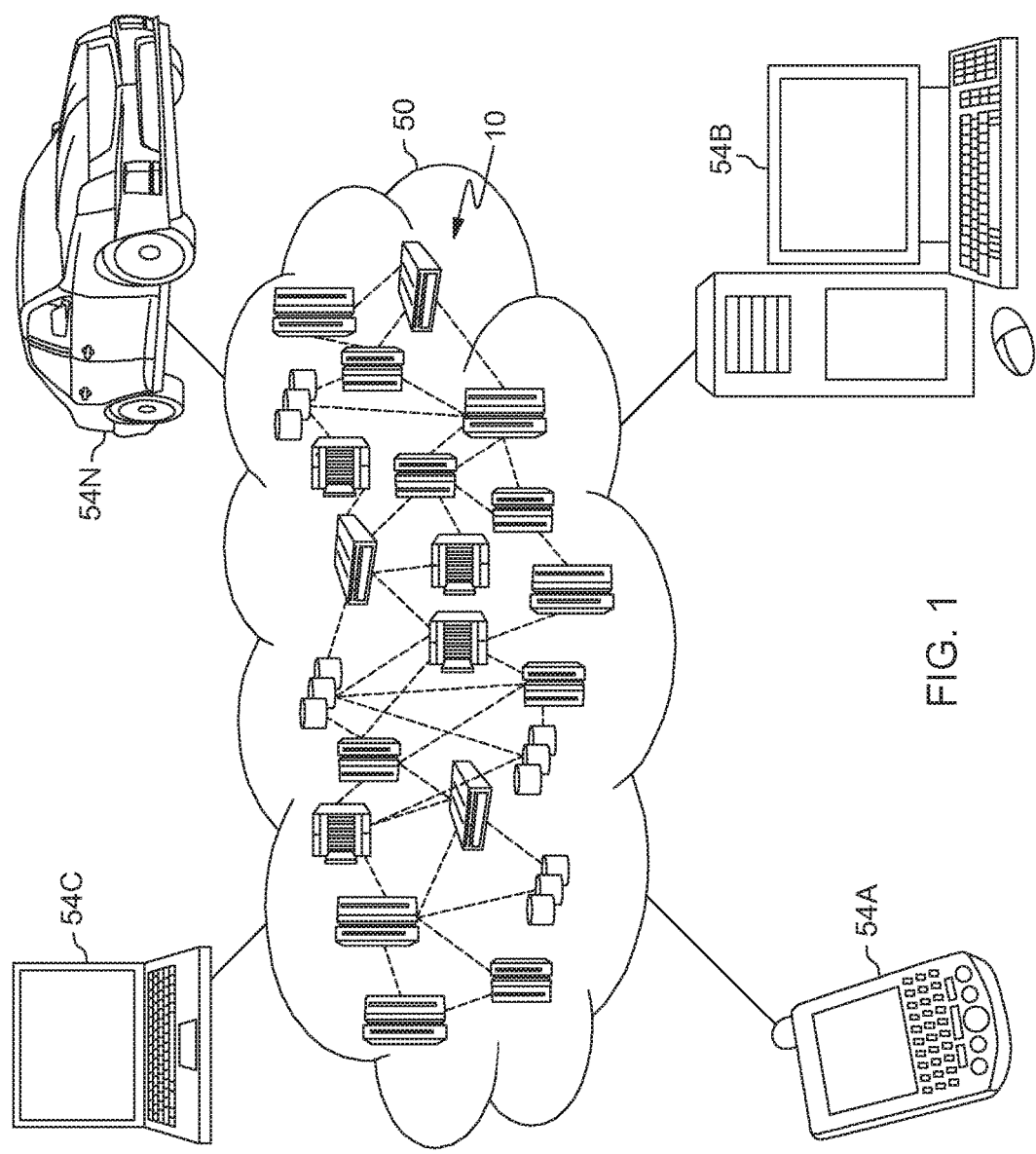
FIG. 1 depicts a cloud computing environment according to an embodiment of the present invention.

Embodiments in accordance with the present invention allow users to conveniently shorten multimedia content and optionally receive summaries for those shortened parts. When viewing multimedia content such as a video and/or text, a user may not want to view certain parts of the multimedia content. For example, the user may want parts of the content to be summarized for faster browsing, or to recommend shortened versions of the content to one or more other users. Upon recommending the multimedia content to the one or more other users, the user may fold up one or more sections (or parts) of the multimedia content that may be irrelevant to the one or more other users (using, for example, a gesture on a touch enabled display). Further, embodiments in accordance with the present invention recognize that, when repetitively viewing multimedia content, such as an online education video, a user may want to progressively de-emphasize video parts that are learned or that the user has become familiar with as the video is viewed over time. Conversely, sometimes a user may want to expand the de-emphasized parts of the video to recall certain details. Existing methods to preview video parts, or collapse text parts, do not provide consistent methods for users to conveniently shorten multimedia content, nor do they provide summaries for shortened multimedia content.

Embodiments in accordance with the present invention will now be described in detail with reference to the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
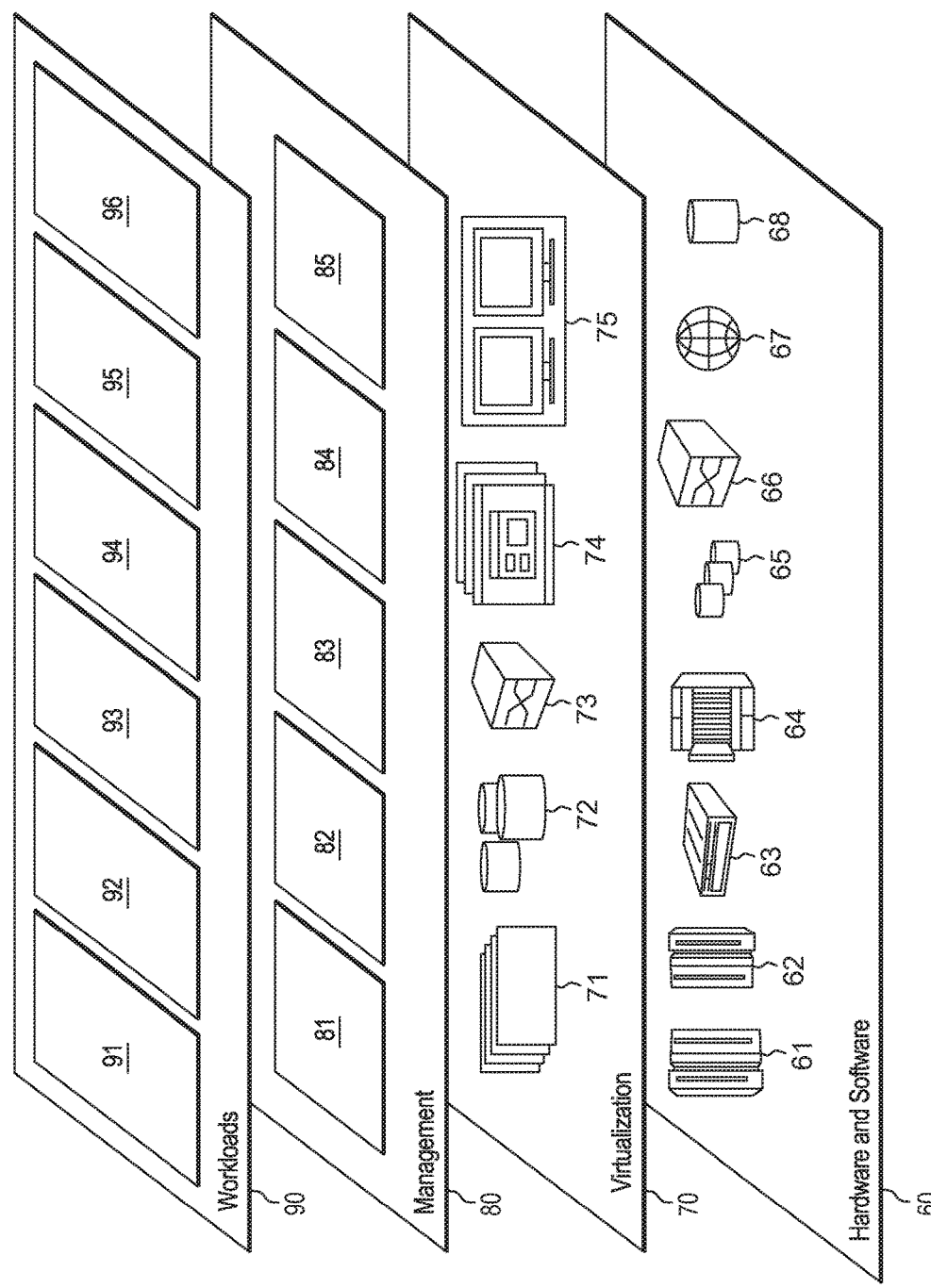
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content manager 96.

Figure 3:
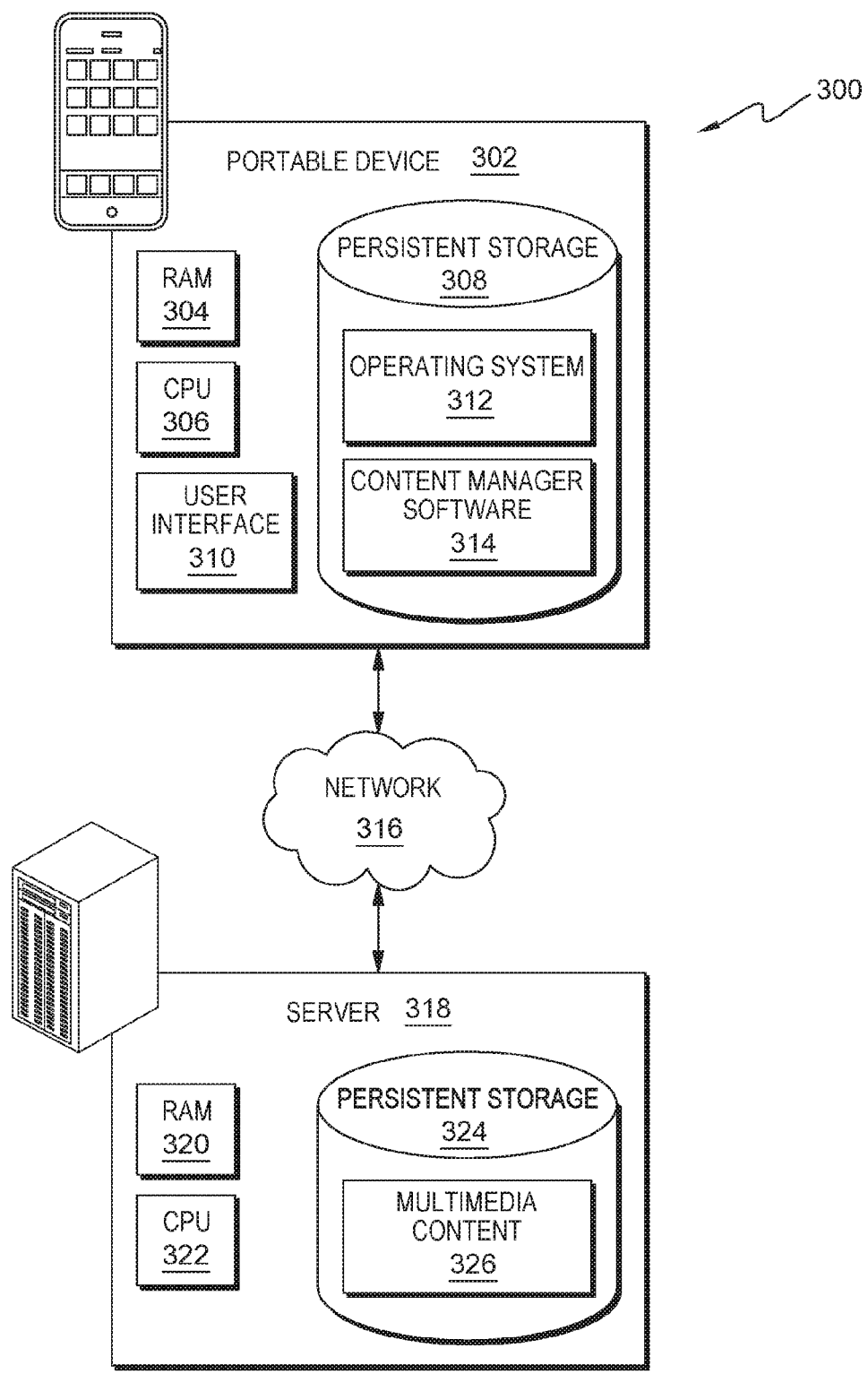
FIG. 3 is a diagram illustrating a data processing environment, in an embodiment in accordance with the present invention.

FIG. 3 is a diagram, generally designated 300, illustrating a data processing environment, in an embodiment in accordance with the present invention.

Data processing environment 300 includes portable device 302, server 318, and other computing devices (not shown), all interconnected over network 316. Portable device 302 includes random access memory (RAM) 304, central processing unit (CPU) 306, and persistent storage 308. Portable device 302 may be a Web server, or any other electronic device or computing system, capable of processing program instructions and receiving and sending data. In some embodiments, portable device 302 may be a laptop computer, a tablet computer, a netbook computer, a personal computer (PC), a desktop computer, a personal digital assistant (PDA), a smart phone, or any programmable electronic device capable of communicating over a data connection to network 316. In other embodiments, portable device 302 may represent server computing systems utilizing multiple computers as a server system, such as in a distributed computing environment. In general, portable device 302 is representative of any electronic device or combinations of electronic devices capable of executing machine-readable program instructions and communicating with server 318 via network 316 and with various components and devices (not shown) within data processing environment 300.

Portable device 302 includes persistent storage 308. Persistent storage 308 may, for example, be a hard disk drive. Alternatively, or in addition to a magnetic hard disk drive, persistent storage 308 may include a solid state hard drive, a semiconductor storage device, read-only memory (ROM), erasable programmable read-only memory (EPROM), flash memory, or any other computer-readable storage medium that is capable of storing program instructions or digital information. Content manager software 314 is stored in persistent storage 308, which also includes operating system 312, as well as software (not shown) that enables portable device 302 to communicate with server 318 and other computing devices (not shown) of data processing environment 300 over a data connection on network 316. In other example embodiments, content manager software 314 may be one or more components of operating system 312 and use one or more "curves" on a progress bar to control the playing speed of selected multimedia content segments.

Content manager software 314 is a computer program, or sets of computer programs, that are stored in persistent storage 308. Content manager software 314 enables a user to shorten and/or expand multimedia content by performing actions (such as "pinching") on the progress bar. Pinching is used to select and collapse multimedia content. For example, a user may collapse and expand the same multimedia content to different levels by shrinking and stretching two fingers on a progress bar. Upon shrinking, the selected progress bar segment collapses into a curve, whereas stretching the selected segment expands the segment to a curve with less sag, or to a straight line again. Curve shapes will change to reflect the pinching degree, as visual feedback. Content manager software 314 may allow multiple pinched curves to co-exist at the same time. Content manager software 314 may allow a user to shorten one or more progress bar segments manually or automatically by running an automatic shortening algorithm to remember a user's previously shortened multimedia content. Once the selected multimedia segments are stored, content manager software 314 may shorten all future occurrences of the content or re-shorten all occurrences at a later time when the multimedia content is replayed.

Content manager software 314 creates a "sag" or a curve representing the shortened multimedia content on the progress bar. As a user decreases a selected progress segment, content manager software 314 increases the sag of the pinched curve. Content manager software 314 also allows a user to expand the curve of the shortened multimedia content by using an "expand" gesture to stretch or put the content back to original length again by spreading the curve apart. A summary of the original content is displayed at the shortened segment, and the summary length corresponds to the shortened progress length. The summary is comprised of one or more segments of the original multimedia content. For example, the summary may be comprised of one or more frames of video, or the first ten words on a paragraph. Some embodiments of the present invention are capable of playing the summarized multimedia segments with no additional graphical user interface (GUI) elements added to user interface 310. Some embodiments of the present invention can smoothly change the content playing speed of selected content segments. Some embodiments of the present invention provide auto content collapsing based on big data analysis and user behavior analysis. Some embodiments of the present invention provide different access control rules on collapsed contents, i.e., users with different authorities can view contents that are collapsed to different degrees.

Portable device 302 includes user interface 310. User interface 310 is a program that provides an interface between a user of portable device 302 and a plurality of applications that may reside in portable device 302 (e.g., content manager software 314), and/or applications on computing devices that may be accessed over a data connection on network 316. A user interface, such as user interface 310, refers to the information (e.g., graphic, text, sound) that a program presents to a user and the control sequences the user employs to control the program. User interface 310 is a type of interface that allows users to interact with peripheral devices (i.e., external computer hardware that provides input and output for a computing device, such as a keyboard and mouse, or touch enabled display) through graphical icons and visual indicators as opposed to text-based interfaces, typed command labels, or text navigation. The actions in GUIs are often performed through direct manipulation of the graphical elements. A variety of types of user interfaces exist. In one embodiment, user interface 310 is a graphical user interface (GUI). In another embodiment, user interface 310 may be a web user interface (WUI) and can display text, documents, web browser windows, user options, application interfaces, and instructions for operation, and includes the information (such as graphic, text, and sound) that a program presents to a user and the control sequences the user employs to control the program. User interface 310 may also be mobile application software that provides an interface between a user of portable device 302 and server 318, and other devices (not shown), over a data connection on network 316. Mobile application software, or an "app," is a computer program designed to run on smart phones, tablet computers and other mobile devices. User interface 310 enables a user of portable device 302, and content manager software 314, to shorten and/or expand multimedia content by performing actions (such as "pinching") on the progress bar.

Figure 10:
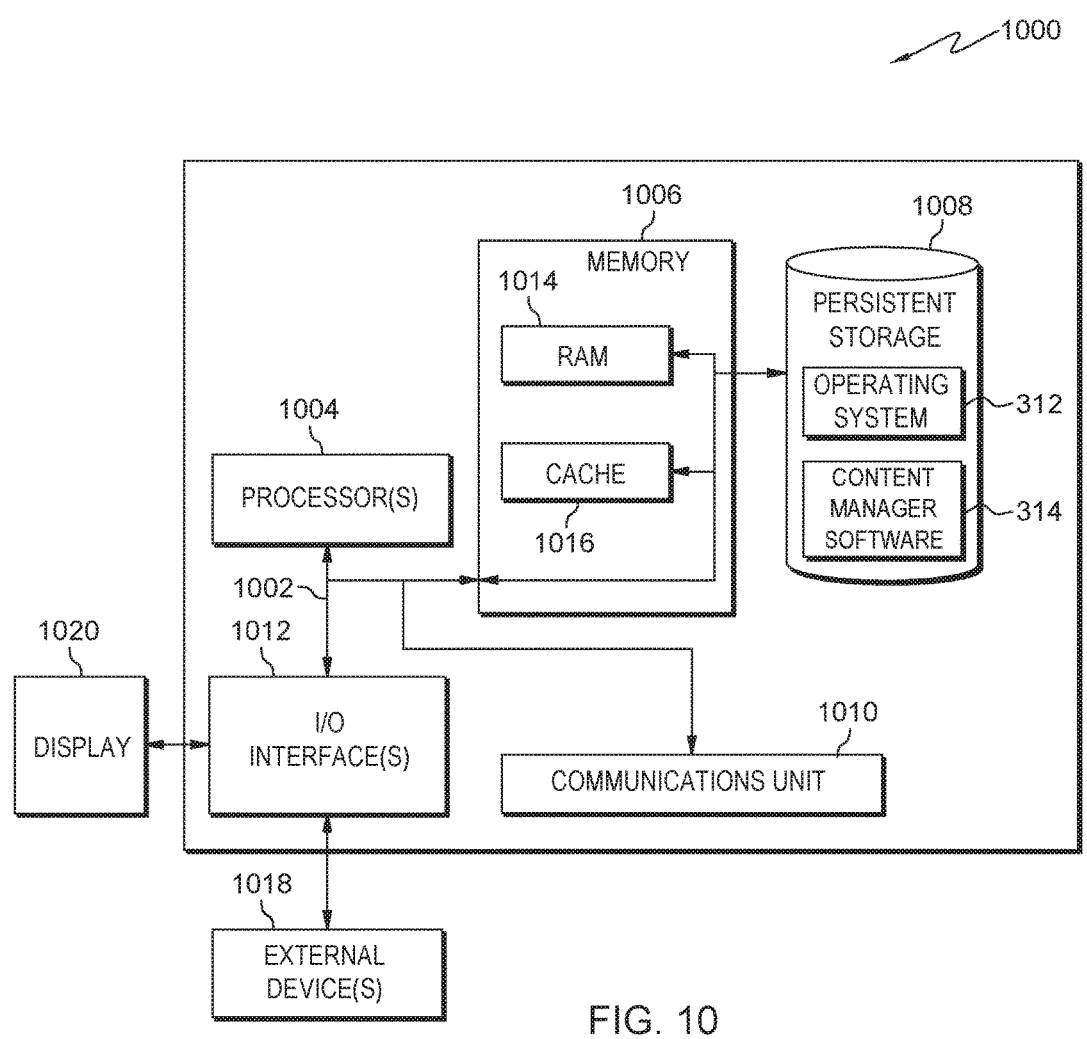
FIG. 10 depicts a block diagram of components of a portable device executing a content manager software, in an embodiment in accordance with the present invention.

Portable device 302 may include internal and external hardware components, as depicted and described in further detail with respect to FIG. 10.

In FIG. 3, network 316 is shown as the interconnecting fabric between portable device 302, server 318, and with various components and devices (not shown) within data processing environment 300. In practice, the connection may be any viable data transport network, such as, for example, a LAN or WAN. Network 316 can be for example, a local area network (LAN), a wide area network (WAN) such as the Internet, or a combination of the two, and include wired, wireless, or fiber optic connections. In general, network 316 can be any combination of connections and protocols that will support communications between portable device 302, server 318, and with various components and devices (not shown) within data processing environment 300.

Server 318 is included in data processing environment 300. Server 318 includes user random access memory (RAM) 320, central processing unit (CPU) 322, and persistent storage 324. Server 318 may be a Web server, or any other electronic device or computing system, capable of processing program instructions and receiving and sending data. In some embodiments, server 318 may be a laptop computer, a tablet computer, a netbook computer, a personal computer (PC), a desktop computer, a personal digital assistant (PDA), a smart phone, or any programmable electronic device capable of communicating over a data connection to network 316. In other embodiments, server 318 may represent server computing systems utilizing multiple computers as a server system, such as in a distributed computing environment. In general, server 318 is representative of any electronic devices or combinations of electronic devices capable of executing machine-readable program instructions and communicating with portable device 302 via network 316 and with various components and devices (not shown) within data processing environment 300.

Server 318 includes persistent storage 324. Persistent storage 324 may, for example, be a hard disk drive. Alternatively, or in addition to a magnetic hard disk drive, persistent storage 324 may include a solid state hard drive, a semiconductor storage device, read-only memory (ROM), erasable programmable read-only memory (EPROM), flash memory, or any other computer-readable storage medium that is capable of storing program instructions or digital information. Multimedia content 326 is stored in persistent storage 324, which also includes operating system software, as well as software that enables server 318 to detect and establish a connection to portable device 302, and communicate with other computing devices (not shown) of data processing environment 300 over a data connection on network 316.

Figure 4:
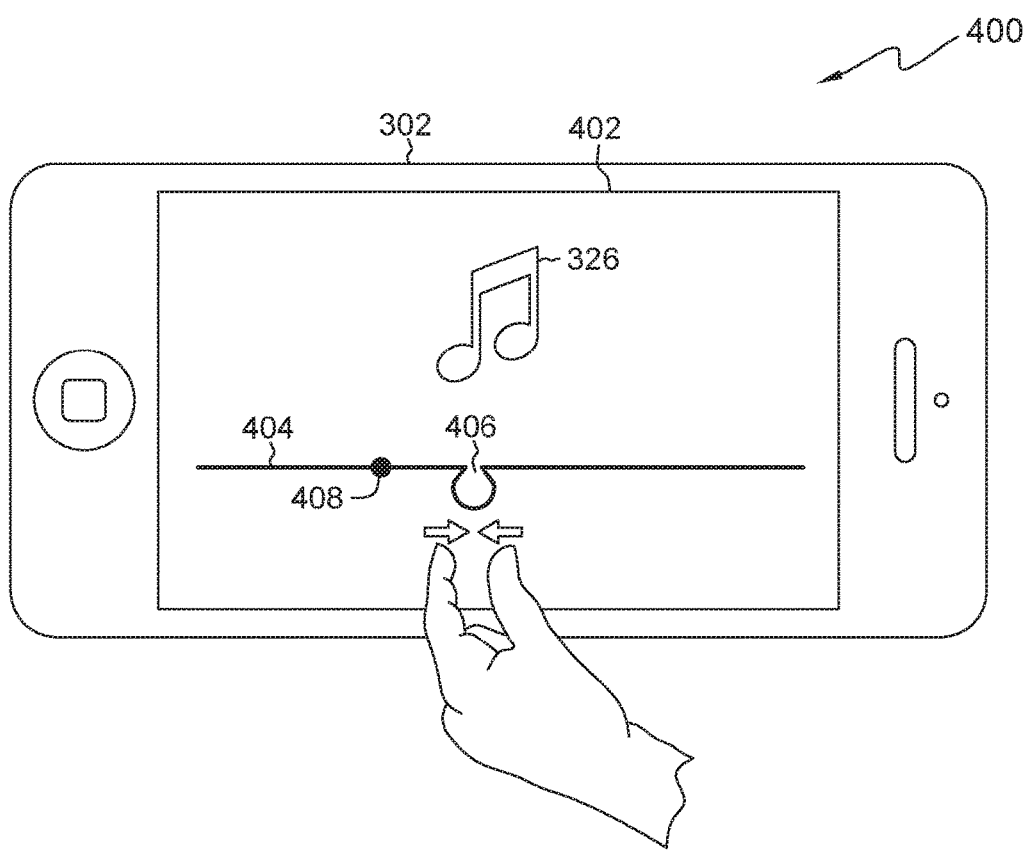
FIG. 4 is a diagram illustrating a shortening of multimedia content on a portable device within the data processing environment of FIG. 3, by a user "pinching" together a segment on a progress bar, in an embodiment in accordance with the present invention.

FIG. 4 is a diagram, generally designated 400, illustrating a shortening of multimedia content on a portable device within the data processing environment of FIG. 3, by a user "pinching" together a segment on a progress bar, in an embodiment in accordance with the present invention. In an example embodiment, a user of portable device 302 is viewing and/or listening to multimedia content 326 via user interface 402 and selects a portion, or segment, to be shortened by content manager software 314 on progress bar 404. Progress bar 404 also includes progress indicator 408 that indicates the current playback position of multimedia content 326. The shortened segment is indicated by a pre-defined sag ratio that is proportional to the shortened multimedia content as depicted by pinched curve 406 also referred to as curve 406. In other example embodiments, content manager software 314 may store the shortened multimedia content in persistent storage 308 to automatically shorten the unwanted segments again at a later time. The unwanted segments of the multimedia content may be stored as time points or values. For example, the start of the shortened multimedia content may be at 3:10, and the end of the shortened multimedia content may be at 6:15. When the multimedia content is viewed again at a later time, content manager software 314 automatically shortens the unwanted segments again.

In one example embodiment, content manager software 314 may allow a user to define auto-processing parameters to: (i) customize the playing speed of multimedia content, by manually or automatically collapsing/expanding content segments, (ii) at a collapsed multimedia segment, play a summary of the collapsed segment instead of the original content, and (iii) enable a user to define access control rules on one or more collapsed content segments to lock/unlock multimedia content segments with different collapsed lengths to different user groups for access control. For example, a user may be required to authenticate in order to view certain collapsed, or summarized portions of multimedia content.

Figure 5:
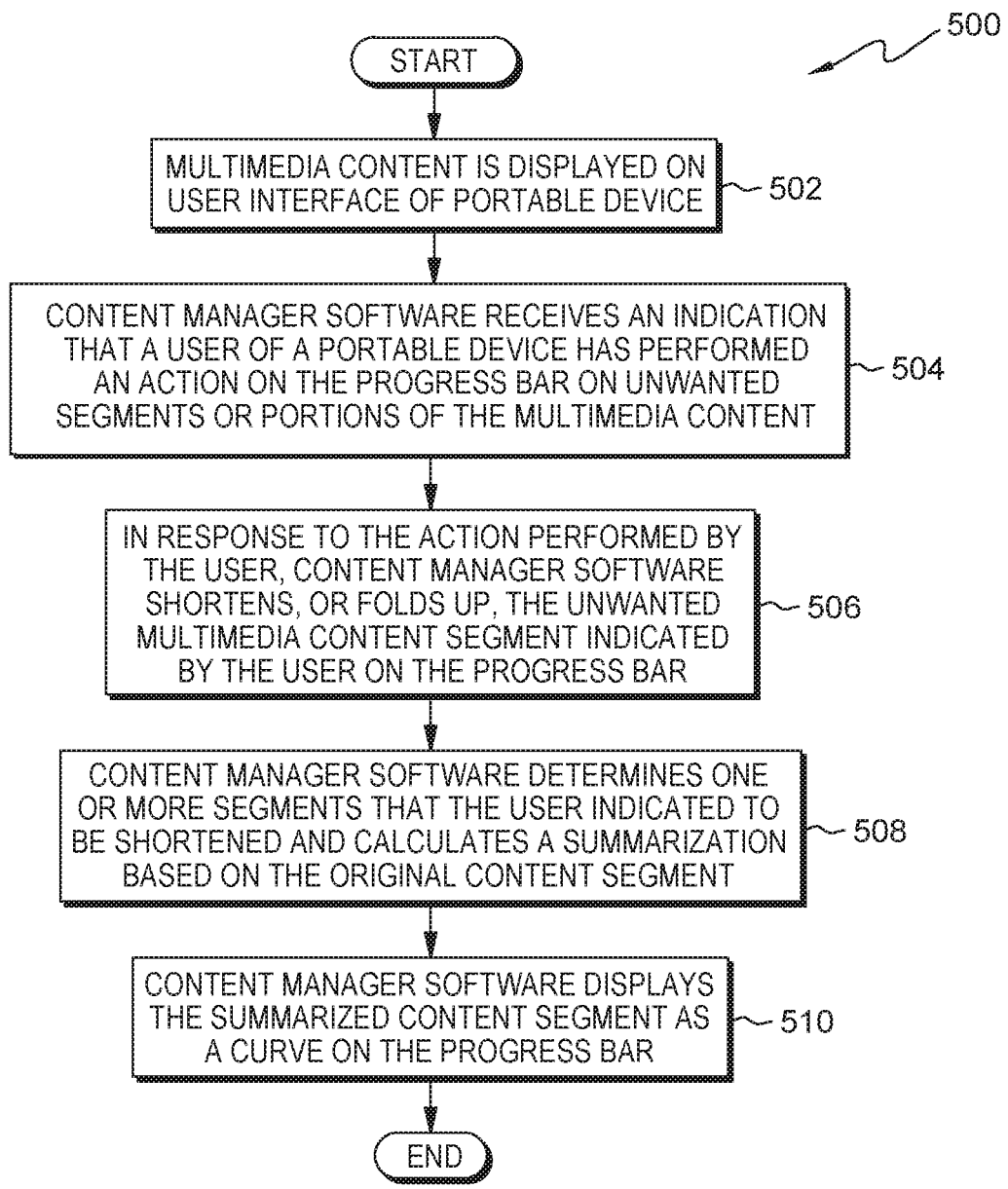
FIG. 5 is a flowchart depicting operational steps of content manager software, on a portable device within the data processing environment of FIG. 3, for shortening multimedia content and displaying a summarized portion as a curve on a progress bar, in an embodiment in accordance with the present invention.

FIG. 5 is a flowchart, generally designated 500, depicting operational steps of content manager software, on a portable device within the data processing environment of FIG. 3, for shortening multimedia content and displaying a summarized portion as a curve on a progress bar, in an embodiment in accordance with the present invention. In an example embodiment, a user of portable device 302 is displaying, or viewing, a representation of multimedia content 326 that includes progress bar 404 on user interface 402 as depicted in step 502.

In step 504, content manager software 314 receives an indication that the user of portable device 302 has performed an action on the progress bar on unwanted segments or portions of the multimedia content. For example, the user may shorten a portion of the multimedia content by performing a pinching action, or gesture, on the unwanted segment together as depicted in FIG. 4. The selected portion of the multimedia content includes a start time and an end time from an original length to a shortened length based, at least in part, on the received indication. In another example embodiment, a user may select the unwanted segments of the multimedia content by using content manager software 314 to mark or indicate the start and end points on progress bar 404 and then instructing content manager software 314 to shorten and/or summarize the unwanted segments according to the user's preferences. User preferences may be defined using content manager software 314 or other software and stored in persistent storage 308.

In response to the action performed by the user, content manager software 314 shortens, or folds up, the unwanted multimedia content segment indicated by the user on progress bar 404 as depicted in step 506. For example, upon modifying the progress bar to represent the shortened portion of the multimedia content, the unwanted multimedia content may appear as curve 406 on progress bar 404. The length of the original portion is represented by a curve adjacent to the progress bar, where a first end of the curve is adjacent to the progress bar at a location indicating the start time, and where a second end of the curve is adjacent to the progress bar at a location indicating the end time. Additionally, the shortened length of the portion is represented by a distance on the progress bar between the location indicating the start time and the location indicating the end time. In another example embodiments, the unwanted multimedia content may appear as a dot, similar to a progress indicator, on progress bar 404. In other example embodiments, the unwanted multimedia content may appear as a series of "breaks", "lines", or "gaps" on progress bar 404. For example, the unwanted multimedia content on progress bar 404 may have a small separation to mark, or indicate, the start of the unwanted multimedia content and another small separation to mark, or indicate, the end of the unwanted multimedia content. When the progress indicator reaches the first separation, content manager software 314 may show a summary of the marked content, or immediately skip to the end of the second separation.

In step 508, content manager software 314 determines one or more segments that the user indicated to be shortened and calculates a summarization based on the original content segment. For example, referring to progress bar 404 in FIG. 4, content manager software 314 determines the length of the unwanted multimedia content and then calculates curve 406 based on the length of the unwanted multimedia content and a user pre-set auto shortening ratio, also referred to as a sag ratio. Content manager software 314 may also provide a summary of the shortened multimedia content that can be displayed at the shortened multimedia segment. For example, when replaying the multimedia content, content manager software 314 may display one or more frames of the multimedia content when the progress indicator reaches the shortened multimedia segment. In another example embodiment, content manager software 314 may display the multimedia content as a time-lapse summary (e.g., speed up the video), when the progress indicator reaches the shortened multimedia segment.

Content manager software 314 displays the summarized content segment as curve 406 on the progress bar as depicted in step 510. For example, when the user removes his/her fingers from progress bar 404 using user interface 402, content manager software 314 may display curve 406 on progress bar 404. In another example embodiment, curve 406 may be displayed as an extension, or projection, of progress bar 404 showing the unwanted multimedia content and allowing the user of portable device 302 to adjust the size and/or content to finalize the selected multimedia content. In other example embodiments, access control features may be incorporated into the unwanted or shortened multimedia segments. For example, in addition to folding up the unwanted segments, the user may also fold up segments of the multimedia content to hide from some viewers. For example, before placing a video on a cloud server, the user may fold up one or more video segments to be hidden from viewers. As a result, viewers can only view summaries of the one or more segments unless the viewers pay to expand the shortened multimedia content. In another example embodiment, an author of multimedia content may incorporate access control rules to prevent manual or automatic shortening on the multimedia content. In this embodiment, shortening one or more segments of the multimedia content can require a user to pay a fee.

Figure 6:
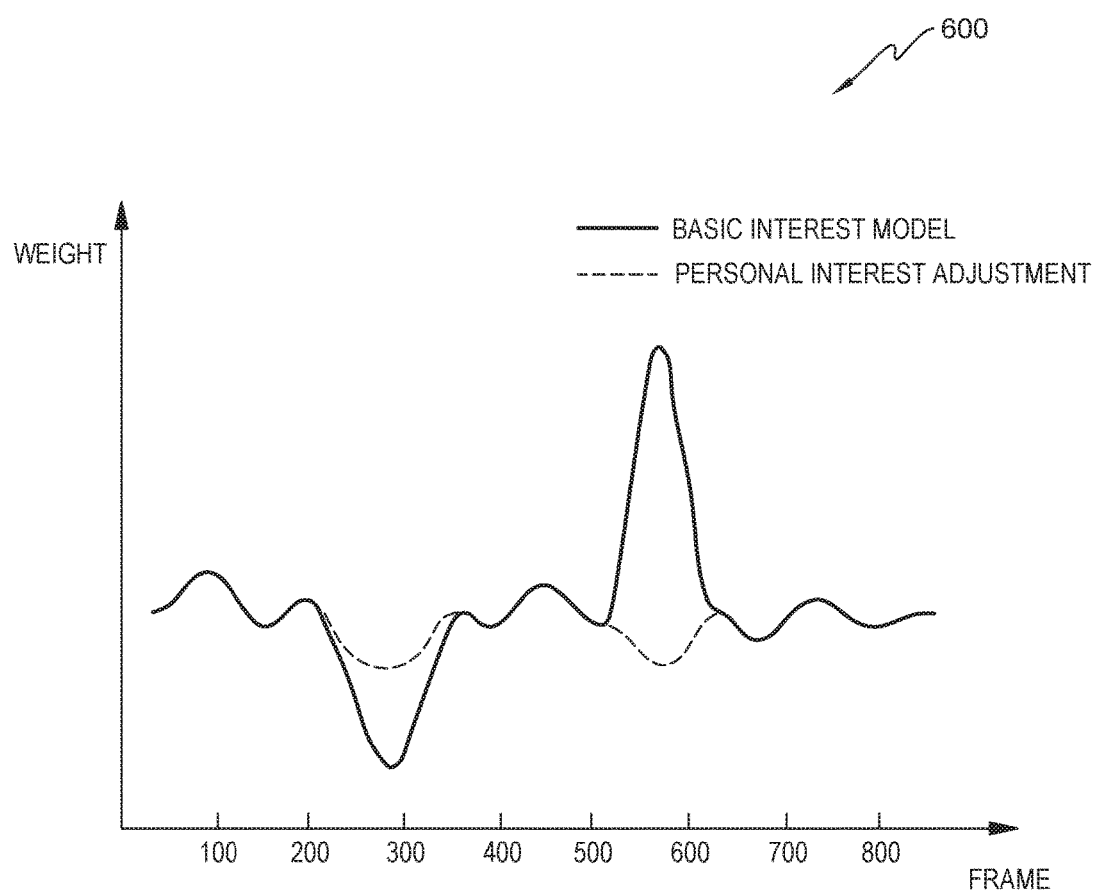
FIG. 6 is a time diagram illustrating a personal interest model used in calculating weights for shortening multimedia segments based on a user's personal interests, in an embodiment in accordance with the present invention.

FIG. 6 is a time diagram, generally designated 600, illustrating a personal interest model used in calculating weights for shortening multimedia segments based on a user's personal interests, in an embodiment in accordance with the present invention. When operating in an automatic curve generation mode for a respective multimedia content, content manager software 314 may filter content that a current user may not like based on big data analysis of similar users, and on user behavior learning of the current user. For example, content manager software 314 may compare the personal interests, behavior, and/or a profile of the current user to one or more similar users who have viewed the respective multimedia content. For example, when a user is playing a video on portable device 302, content manager software 314 calculates a weight for each frame of the video that indicates the user's personal interest on the frame. To calculate weights for frames, content manager software 314 generates a basic interest model, which analyzes big data of other users that have similar personal interest traits as the user of portable device 302. The more personal characteristics in the profile for the user of portable device 302, the more accurately the basic interest model will match the user of portable device 302. Content manager software 314 will then analyze the recent personal behavior of the user, to get a personal interest adjustment, to merge into the basic interest model, to generate a refined and more accurate personal model of the user as depicted in FIG. 6. As shown in FIG. 6, two portions of the basic interest model are adjusted according to the user's personal interest: the portion corresponding to frames 200 through 350 and the portion corresponding to frames 500 through 650.

In certain embodiments, frames that have lowest weights will be shortened. The shortening rate corresponds to the number of low-weight frames within an area. For example, referring to FIG. 6, the frames between 200 and 350 having the lowest determined weights may be shortened and summarized.

Based on the personal interest model, content manager software 314 can determine each frame's weight, and select high-weight frames in the folded area to generate the summary using the following example code snippet (Code Snippet 1):

---
Code Snippet 1 - Summary Generation selected_frame_number = all_frame_number * shortening_ratio
OrderByWeight(all_frames)
Select(selected_frame_number)

---

In Code Snippet 1, the "selected_fram_number" is determined by calculating the product of "all_frame_number" and the "shortening_ratio" (i.e., sag ratio). The frames are then ordered by their determined weight using the determined weight from the generated basic interest model. The frames with the highest weight are then selected to be used in the summary.

Figure 7:
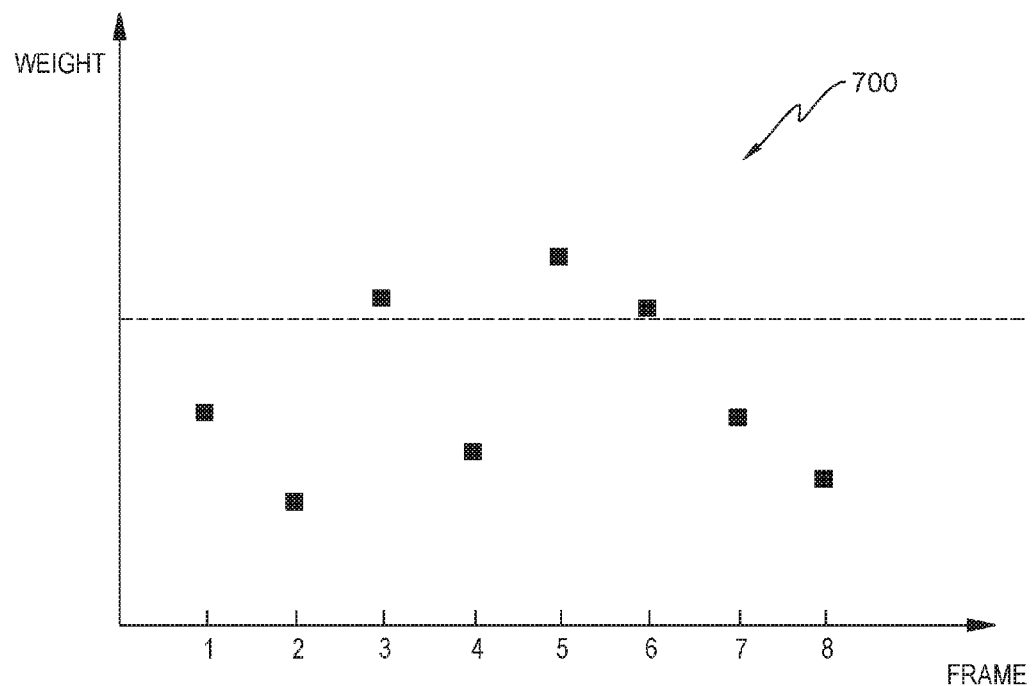
FIG. 7 is a weight diagram illustrating the number of frames contained in a folded area of a pinched multimedia segment, in an embodiment in accordance with the present invention.

FIG. 7 is a weight diagram, generally designated 700, illustrating the number of frames contained in a folded area of a pinched multimedia segment, in an embodiment in accordance with the present invention. Continuing with the example of a user playing a video on portable device 302, there are 8 frames in the folded area, and the shortening ratio is 3/8 as depicted in FIG. 7, content manager software 314 will then select the 3 frames with highest weight to compose the summary as illustrated by frames 3, 5, and 6.

Figure 8A:
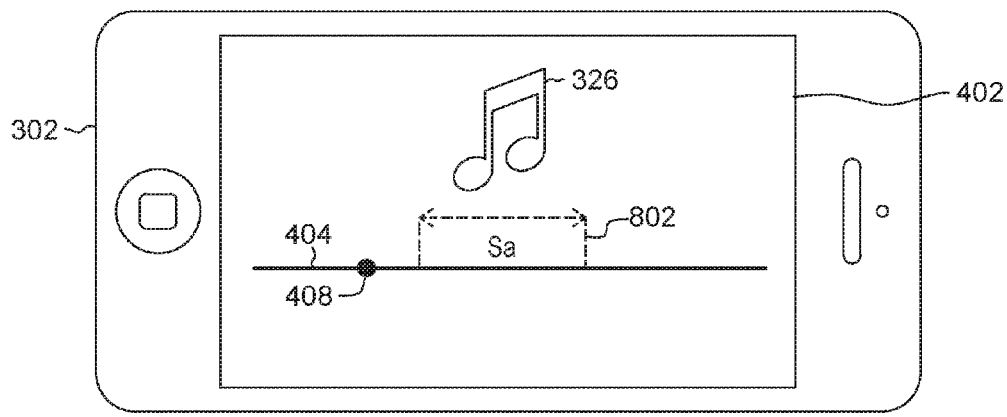
FIGS. 8A-8C are diagrams illustrating the manual shortening of a multimedia segment on a portable device within the data processing environment of FIG. 3, in an embodiment in accordance with the present invention.
Figure 8B:
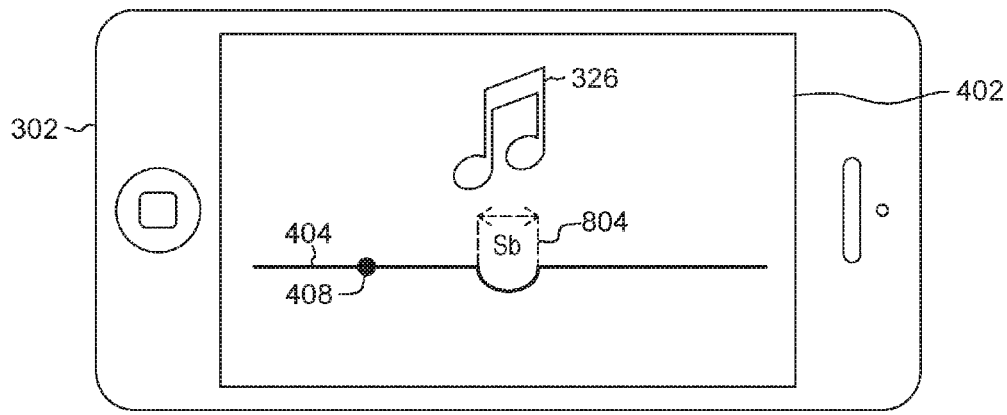
Figure 8C:
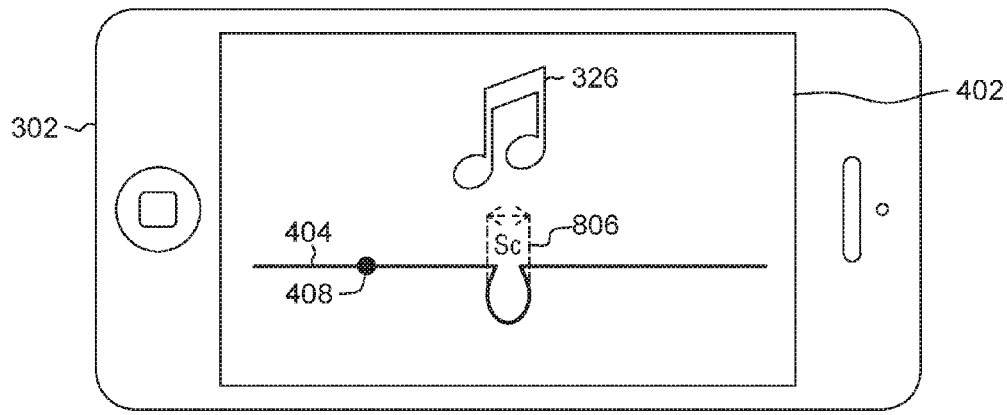

FIGS. 8A-8C are diagrams illustrating the manual shortening of a multimedia segment on a portable device within the data processing environment of FIG. 3, in an embodiment in accordance with the present invention. In an example embodiment, a user of portable device 302 is viewing multimedia content 326 using user interface 402 as indicated by progress bar 404 in FIG. 8A. Progress bar 404 includes progress indicator 408. The user selects a segment of the multimedia content to shorten and content manager software 314 determines the length of the selected multimedia content as indicated by "Sa" 802. For example, "Sa" 802 may be 1 centimeter long, and maps to a 1 minute segment of the multimedia content. Content manager software 314 calculates a curve based on the length of the selected multimedia content "Sa" 802 as depicted in FIG. 8B. Progress bar 404 now shows the original 1 centimeter selection "Sa" 802 as a 1 centimeter curve with a new length "Sb" 804. In one example embodiment content manager software 314 may allow a user to configure, or pre-set, an auto shortening ratio (or "sag ratio") that will keep the displayed curve proportional to progress bar 404. For example, a user may want to upload multimedia content, such as a movie, to a cloud service, and only allow users to view the first minute. The user may pinch the entire length of the progress bar thus creating a curve that may be too large to fit on user interface 402. Content manager software 314 enables a user to define a shortening ratio, also referred to as an auto-shortening ratio, Beta (i.e., "β"), to keep the calculated curve proportional to progress bar 404. For example, the user defines the shortening ration to be "0.5", then the length of "Sb" 804 will be "Sa" 802*β=1 cm* 0.5=0.5 cm, and the content segment that "Sb" 804 maps to will be a 0.5 minute summarization of the original 1 minute content segment as depicted by "Sc" 806 in FIG. 8C.

In one example embodiment, the manual shortening of selected multimedia content may be performed by the user gesture of "pinch" used on touch screens or a touch pad of personal computers (PCs). In other example embodiments, semi-auto shortening of selected multimedia content may be performed when a user specifies unwanted pictures and/or text, and existing image recognition and text search technologies can be referenced to filter contents.

Figure 9A:
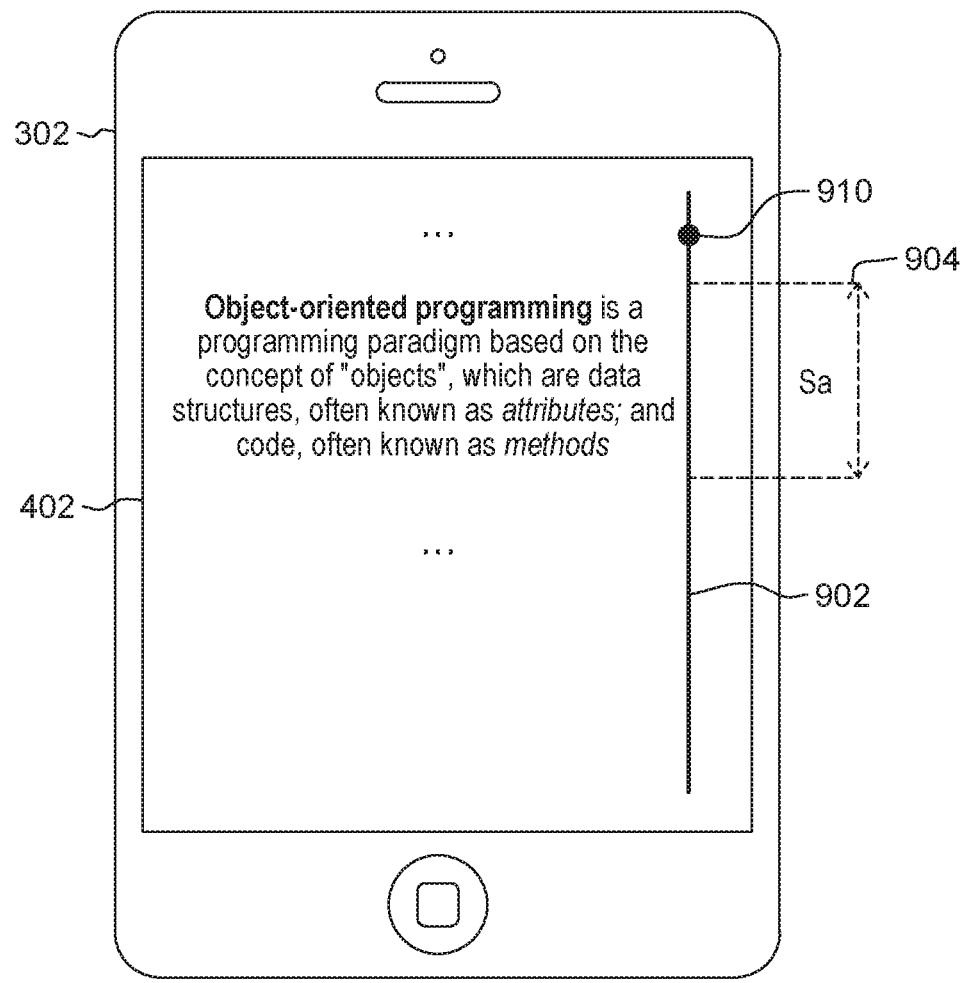
FIGS. 9A-9C are diagrams illustrating the manual shortening of a text document on a portable device within the data processing environment of FIG. 3, in an embodiment in accordance with the present invention.
Figure 9B:
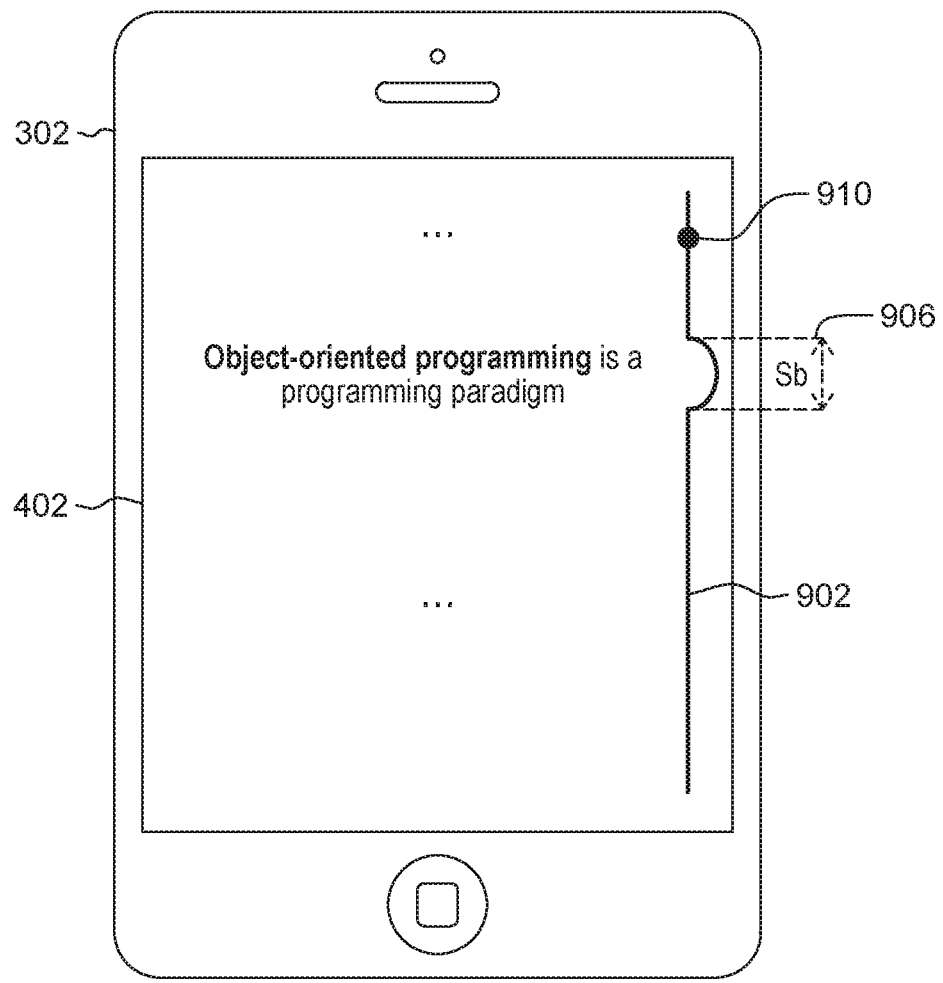
Figure 9C:
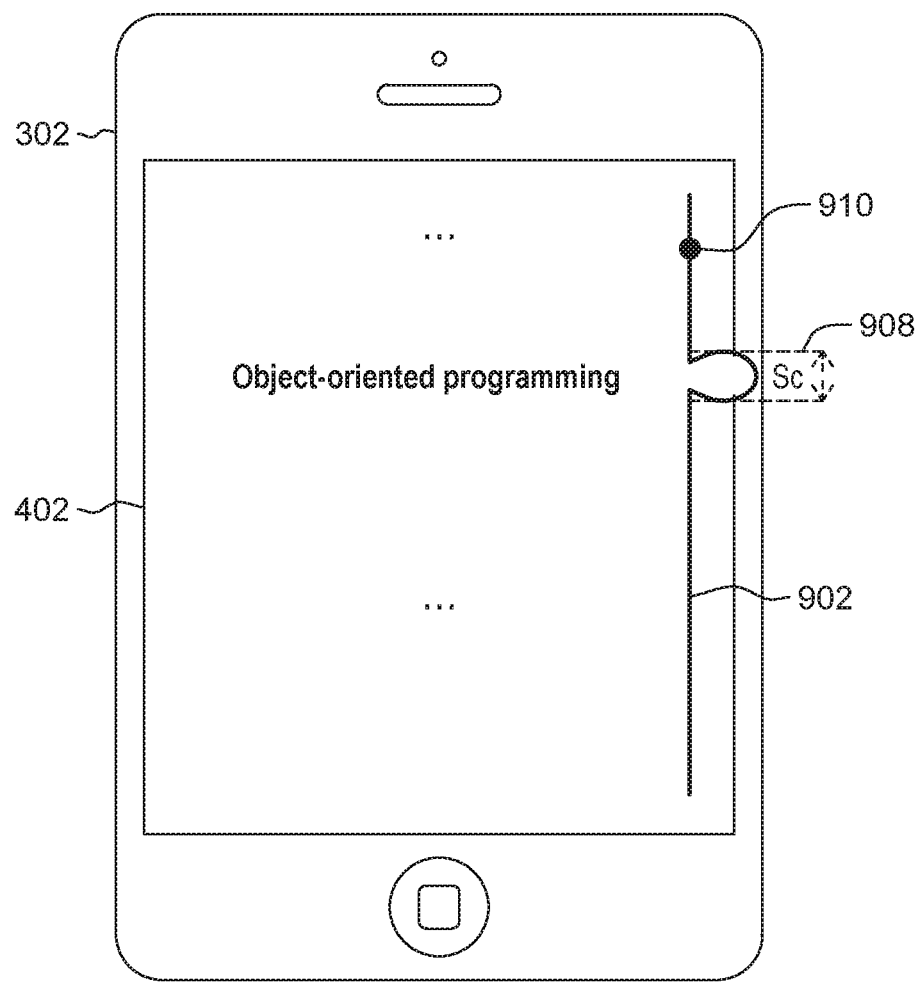

FIGS. 9A-9C are diagrams illustrating the manual shortening of a text document on a portable device within the data processing environment of FIG. 3, in an embodiment in accordance with the present invention. In the example embodiment of FIG. 9A, a user is viewing multimedia content 326 as a text document using portable device 302 and user interface 402. Progress bar 902 is displayed vertically on user interface 402 and allows the user scroll or navigate the text document, and receive a visual indication of where the user is in the document. Progress bar 902 includes progress indicator 910 to indicate where the user is in the text document.

Content manager software 314 receives an indication that the user would like to shorten the multimedia content and determines the length of the unwanted multimedia content as depicted by "Sa" 904. Content manager software 314 calculates the curve based on the selected segment "Sa" 904 and defined shortening ratio as described in relation to FIG. 8C, then displays the corresponding curve "Sb" 906 as depicted in FIG. 9B. In another example embodiment, a user may further shorten the already shortened multimedia content. For example, a user may select "Sb" 906 and pinch it to further reduce the unwanted multimedia content as depicted by "Sc" 908 in FIG. 9C.

Some advantages of the present invention include: (i) enabling users to manually/semi-automatically/automatically "fold up" one or more parts of multimedia content, so that the user can quickly browse the summarized parts, (ii) finer granularity of access control of shared multimedia content, which can be targeted at discrete content segments instead of the whole content, (iii) dynamically generating summaries of shortened multimedia content to various degrees, or even skip the summarized segments completely, (iv) enabling users to expand the shortened multimedia segments when they want to recall the details, and/or (v) an auto folding feature, or mode, that can match a current user's personal interest based on an integration of big data analysis of similar users and user behavior analysis of the current user.

FIG. 10 depicts a block diagram, generally designated 1000, of components of a portable device executing a content manager software, in an embodiment in accordance with the present invention. It should be appreciated that FIG. 10 provides only an illustration of one implementation and does not imply any limitations with regard to the environments in which different embodiments may be implemented. Many modifications to the depicted environment may be made.

Portable device 302 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer readable storage media. In this embodiment, memory 1006 includes random access memory (RAM) 1014 and cache memory 1016. In general, memory 1006 can include any suitable volatile or non-volatile computer readable storage media.

Operating system 312 and content manager software 314 are stored in persistent storage 1008 for execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices, including resources of network 316 and server 318. In these examples, communications unit 1010 includes one or more network interface cards. Communications unit 1010 may provide communications through the use of either or both physical and wireless communications links. Operating system 312 and content manager software 314 may be downloaded to persistent storage 1008 through communications unit 1010.

I/O interface(s) 1012 allows for input and output of data with other devices that may be connected to portable device 302. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., operating system 312 and content manager software 314, can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that may possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

What is claimed is:

1. A computer-implemented method comprising:
    displaying, by one or more computer processors, a representation of multimedia content that includes a progress bar;
    shortening, by one or more computer processors, a portion of the multimedia content having a start time and an end time from an original length to a shortened length based, at least in part, on a received indication; and
    modifying, by one or more computer processors, the progress bar to represent the shortened portion of the multimedia content;
    wherein the original length of the portion is represented by a curve adjacent to the progress bar, where a first end of the curve is adjacent to the progress bar at a location indicating the start time, and where a second end of the curve is adjacent to the progress bar at a location indicating the end time, and
    wherein the shortened length of the portion is represented by a distance on the progress bar between the location indicating the start time and the location indicating the end time.

2. The computer-implemented method of claim 1, wherein the representation of multimedia content is displayed on a touch-enabled display, and the received indication includes a user performing a pinching gesture corresponding to the progress bar using the touch-enabled display.

3. The computer-implemented method of claim 1, wherein a length of the curve is one of: the original length of the portion, or the original length of the portion modified by a pre-defined sag ratio for keeping a size of the curve proportional to the progress bar.

4. The computer-implemented method of claim 1, further comprising:
    operating, by one or more computer processors, in an automatic curve generation mode, wherein the received indication to shorten the portion of the multimedia content is determined automatically based on at least one of: a user behavior learning of a current user, and a big data analysis of similar users to the current user.

5. The computer-implemented method of claim 4, further comprising:
    determining, by one or more computer processors, personal interests of the current user based on the current user's behavior;
    determining, by one or more computer processors, personal characteristics of the current user from a profile of the current user;
    generating, by one or more computer processors, a basic interest model based, at least in part, on the determined personal interests and personal characteristics; and
    modifying, by one more computer processors, the basic interest model based, at least in part on behavior of users with similar interests and/or characteristics to the current user.

6. The computer-implemented method of claim 1, wherein the multimedia content includes scrollable text.

7. The computer-implemented method of claim 1, further comprising:
expanding, by one or more computer processors, the shortened portion of the multimedia content based on a received indication.

8. The computer-implemented method of claim 7, wherein the representation of multimedia content is displayed on a touch-enabled display, and the received indication to expand the shortened portion of the multimedia content includes a user performing an expanding gesture corresponding to the progress bar using the touch-enabled display.

9. The computer-implemented method of claim 1, wherein shortening the portion of the multimedia content includes at least one of: modifying a playing speed of the portion of the multimedia content, and replacing the portion of the multimedia content with a summarized portion.

10. The computer-implemented method of claim 1, further comprising:
expanding, by one or more computer processors, the portion of the multimedia content to the original length based, at least in part, on a user authentication.

11. A computer program product comprising:
one or more computer readable storage media and program instructions stored on the one or more computer readable storage media, the program instructions comprising:
program instructions to display a representation of multimedia content that includes a progress bar;
program instructions to shorten a portion of the multimedia content having a start time and an end time from an original length to a shortened length based, at least in part, on a received indication; and
program instructions to modify the progress bar to represent the shortened portion of the multimedia content;
wherein the original length of the portion is represented by a curve adjacent to the progress bar, where a first end of the curve is adjacent to the progress bar at a location indicating the start time, and where a second end of the curve is adjacent to the progress bar at a location indicating the end time, and
wherein the shortened length of the portion is represented by a distance on the progress bar between the location indicating the start time and the location indicating the end time.

12. The computer program product of claim 11, wherein the representation of multimedia content is displayed on a touch-enabled display, and the received indication includes a user performing a pinching gesture corresponding to the progress bar using the touch-enabled display.

13. The computer program product of claim 11, wherein a length of the curve is one of: the original length of the portion, or the original length of the portion modified by a pre-defined sag ratio for keeping a size of the curve proportional to the progress bar.

14. The computer program product of claim 11, further comprising:
program instructions to operate in an automatic curve generation mode, wherein the received indication to shorten the portion of the multimedia content is determined automatically based on at least one of: a user behavior learning of a current user, and a big data analysis of similar users to the current user.

15. The computer program product of claim 14, further comprising:
program instructions to determine personal interests of the current user based on the current user's behavior;
program instructions to determine personal characteristics of the current user from a profile of the current user;
program instructions to generate a basic interest model based, at least in part, on the determined personal interests and personal characteristics; and
program instructions to modify the basic interest model based, at least in part on behavior of users with similar interests and/or characteristics to the current user.

16. A computer system comprising:
one or more computer processors;
one or more computer readable storage media;
program instructions stored on the computer readable storage media for execution by at least one of the one or more processors, the program instructions comprising:
program instructions to display a representation of multimedia content that includes a progress bar;
program instructions to shorten a portion of the multimedia content having a start time and an end time from an original length to a shortened length based, at least in part, on a received indication; and
program instructions to modify the progress bar to represent the shortened portion of the multimedia content;
wherein the original length of the portion is represented by a curve adjacent to the progress bar, where a first end of the curve is adjacent to the progress bar at a location indicating the start time, and where a second end of the curve is adjacent to the progress bar at a location indicating the end time, and
wherein the shortened length of the portion is represented by a distance on the progress bar between the location indicating the start time and the location indicating the end time.

17. The computer system of claim 16, wherein the representation of multimedia content is displayed on a touch-enabled display, and the received indication includes a user performing a pinching gesture corresponding to the progress bar using the touch-enabled display.

18. The computer system of claim 16, wherein a length of the curve is one of: the original length of the portion, or the original length of the portion modified by a pre-defined sag ratio for keeping a size of the curve proportional to the progress bar.

19. The computer system of claim 16, further comprising:
program instructions to operate in an automatic curve generation mode, wherein the received indication to shorten the portion of the multimedia content is determined automatically based on at least one of: a user behavior learning of a current user, and a big data analysis of similar users to the current user.

20. The computer system of claim 19, further comprising:
program instructions to determine personal interests of the current user based on the current user's behavior;
program instructions to determine personal characteristics of the current user from a profile of the current user;
program instructions to generate a basic interest model based, at least in part, on the determined personal interests and personal characteristics; and
program instructions to modify the basic interest model based, at least in part on behavior of users with similar interests and/or characteristics to the current user.

* * * * *